(12) United States Patent
Desai et al.

(10) Patent No.: US 8,955,057 B2
(45) Date of Patent: Feb. 10, 2015

(54) MANAGING ACCESS TO CLASS OBJECTS IN A SYSTEM UTILIZING A ROLE-BASED ACCESS CONTROL FRAMEWORK

(71) Applicant: International Business Machines Corporation, Armonk, NY (US)

(72) Inventors: Saurabh Desai, Austin, TX (US); Vidya Ranganathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 13/653,504

(22) Filed: Oct. 17, 2012

(65) Prior Publication Data

US 2014/0109189 A1     Apr. 17, 2014

(51) Int. Cl.
*G06F 21/00* (2013.01)

(52) U.S. Cl.
USPC ............................................. 726/4; 713/164

(58) Field of Classification Search
CPC . G06F 21/6209; G06F 21/6218; G06F 21/62; H04L 63/102; H04L 63/104
USPC .............................................. 726/4; 713/164
See application file for complete search history.

(56) References Cited

U.S. PATENT DOCUMENTS

| 5,347,578 | A  | * | 9/1994 | Duxbury | 707/781 |
| 6,470,353 | B1 | * | 10/2002 | Yaung et al. | 1/1 |
| 6,574,736 | B1 | * | 6/2003 | Andrews | 726/21 |
| 8,117,643 | B2 |  | 2/2012 | Vidya et al. |  |
| 2008/0022370 | A1 | * | 1/2008 | Beedubail et al. | 726/4 |
| 2009/0150981 | A1 | * | 6/2009 | Amies et al. | 726/5 |
| 2010/0043069 | A1 |  | 2/2010 | Vidya et al. |  |
| 2011/0239275 | A1 | * | 9/2011 | De Peuter et al. | 726/4 |

OTHER PUBLICATIONS

Oracle, "System Administration Guide: Security Services", Jul. 2011, pp. 1-678.*
Chalfant; Role Based Access Control and Secure Shell—A Closer Look At Two Solaris™ Operating Environment Security Features; Jun. 2003 (18 pages).
Bezroukov; Solaris Profile Shells; Internet Article (http://www.softpanorama.org/Solaris/Security/RBAC/profile_shells.shtml); Apr. 21, 2012.
Oracle; System Administration Guide: Security Services; Jul. 2011; pp. 1-678.
Faden; Authorization Infrastructure in Solaris; Internet Article (http://www.forteach.net/os/solaris/36014.html); Aug. 2001.

* cited by examiner

*Primary Examiner* — Matthew Smithers
(74) *Attorney, Agent, or Firm* — James L. Baudino (57) ABSTRACT

According to one aspect of the present disclosure a system and technique for managing access to application-based objects in a system utilizing a role-based access control framework is disclosed. The system includes a memory and a processor coupled to the memory, wherein the processor is configured to: determine, for each object class of an application, a privilege needed for invoking a privileged operation associated with the object class; create a privilege shell for a user running the application; set the determined privilege on the privilege shell; associate an authorization to the privilege shell; and invoke the privilege shell to run the application by the user.

10 Claims, 5 Drawing Sheets

MANAGING ACCESS TO CLASS OBJECTS IN A SYSTEM UTILIZING A ROLE-BASED ACCESS CONTROL FRAMEWORK

BACKGROUND

In some operating systems, such as a UNIX or UNIX-like operating system, access control mechanisms may be used for controlling access to perform privileged functions, jobs or tasks. For example, in a UNIX or UNIX-like operating system, system administration activities are typically performed through a root user account. System administrators responsible for the administration of the system share and/or manage the password to the root account or use access control tools which allow access to the desired jobs/services/objects after authentication has been provided. Thus, the access control tools may be used to grant or revoke access rights for individual users or a group of users.

In order to achieve a higher grade of data security and integrity in a computer system, a role-based access control (RBAC) method and system may be used to execute privileged tasks. The RBAC approach has three main elements: authorizations, roles, and privileges. An authorization is analogous to access rights such that it provides a mechanism to grant rights to perform certain actions on the computer system, thereby providing different levels of functionality to various users. A role is a set of management functions unique to a user on the computer system. Multiple authorizations may be assigned to a role in order to enable users under that role to perform the requisite management functions. Privileges are part of the RBAC infrastructure that provides fine granular control of system functions. A user usually acquires privileges based on authorizations granted to their role. In other words, regular users are allowed access to various system functions when they have relevant privileges. Privileges are typically mapped to bit masks and are used in the kernel space to achieve privileged function-specific security controls. In practice, a role acts as a definition of a job at the lowest level of granularity used in the enterprise or organization. Roles are similar to the regular user identities except that roles are authorized to perform some privileged tasks. Regular users who are assigned to some roles can perform root user functions based on the privileges granted by acquiring or switching into that role. For example, one role might be to manage file systems, while another role might be to enable creation of user accounts. In the RBAC system, the system administrator only has to grant or revoke authorizations to a role, and group different users of the computer system under each role.

BRIEF SUMMARY

According to one aspect of the present disclosure a system and technique for managing access to class objects in a system utilizing a role-based access control framework is disclosed. The system includes a memory and a processor coupled to the memory, wherein the processor is configured to: determine, for each object class of an application, a privilege needed for invoking a privileged operation associated with the object class; create a privilege shell for a user running the application; set the determined privilege on the privilege shell; associate an authorization to the privilege shell; and invoke the privilege shell to run the application by the user.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method and technique for managing access to class objects in a system utilizing a role-based access control framework. For example, in some embodiments, the method and technique includes: determining, for each object class of an application, a privilege needed for invoking a privileged operation associated with the object class; creating a privilege shell for a user running the application; setting the determined privilege on the privilege shell with the privilege; associating an authorization to the privilege shell; and invoking the privilege shell to run the application by the user. Embodiments of the present disclosure enable applications that are not RBAC-aware to be managed in a manner so that root privileges are not made available to unintended users. For example, in some embodiments of the present disclosure, the different classes of objects that are invoked or caused to be invoked by an RBAC-unaware application corresponding to privileged operations are identified and assigned to a user needing to run the application. A privilege shell is created for the user and the identified privileges set for the privilege shell. The privilege shell is then made RBAC-aware and is invoked by the user, thereby enabling invocation of the privileged operations of the application based on the privileges assigned to the user and inherited by the privilege shell.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
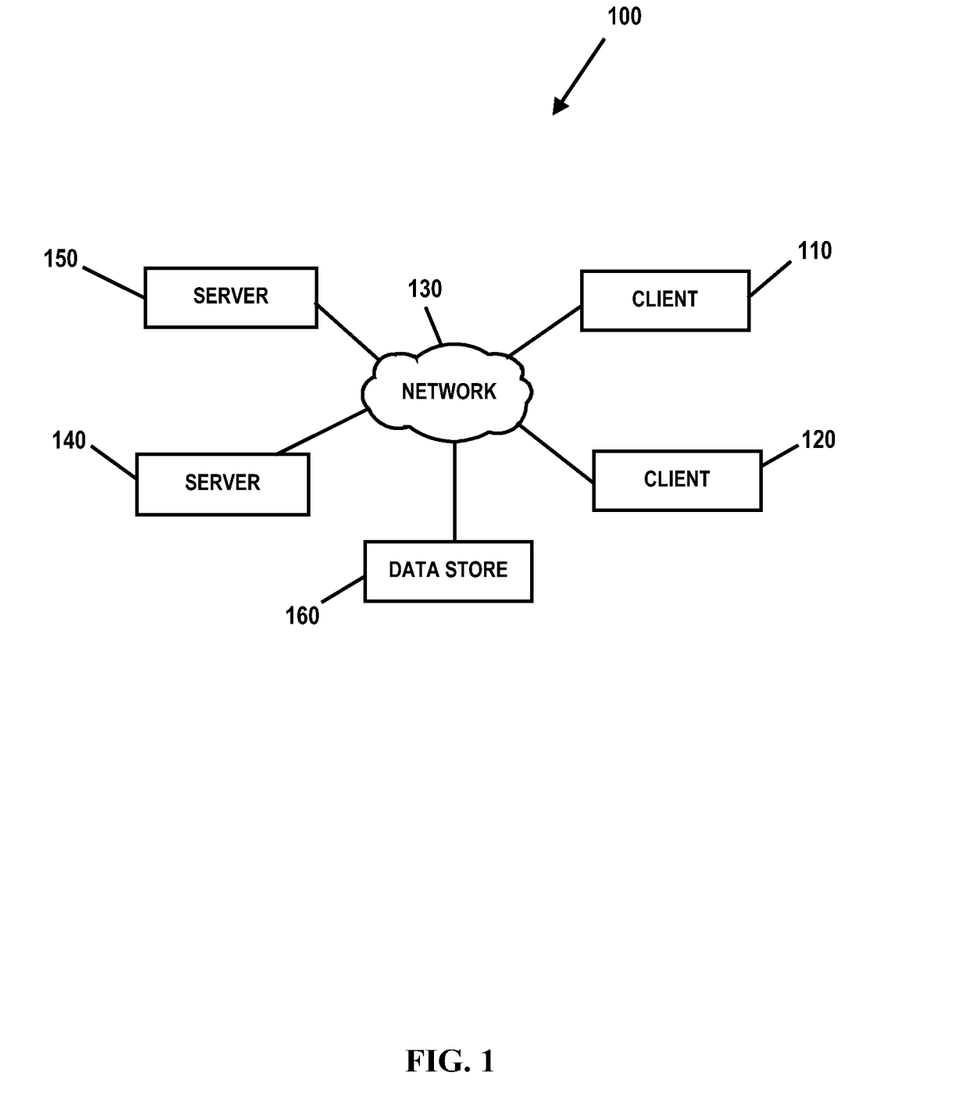
FIG. 1 is an embodiment of a network of data processing systems in which the illustrative embodiments of the present disclosure may be implemented.
Figure 2:
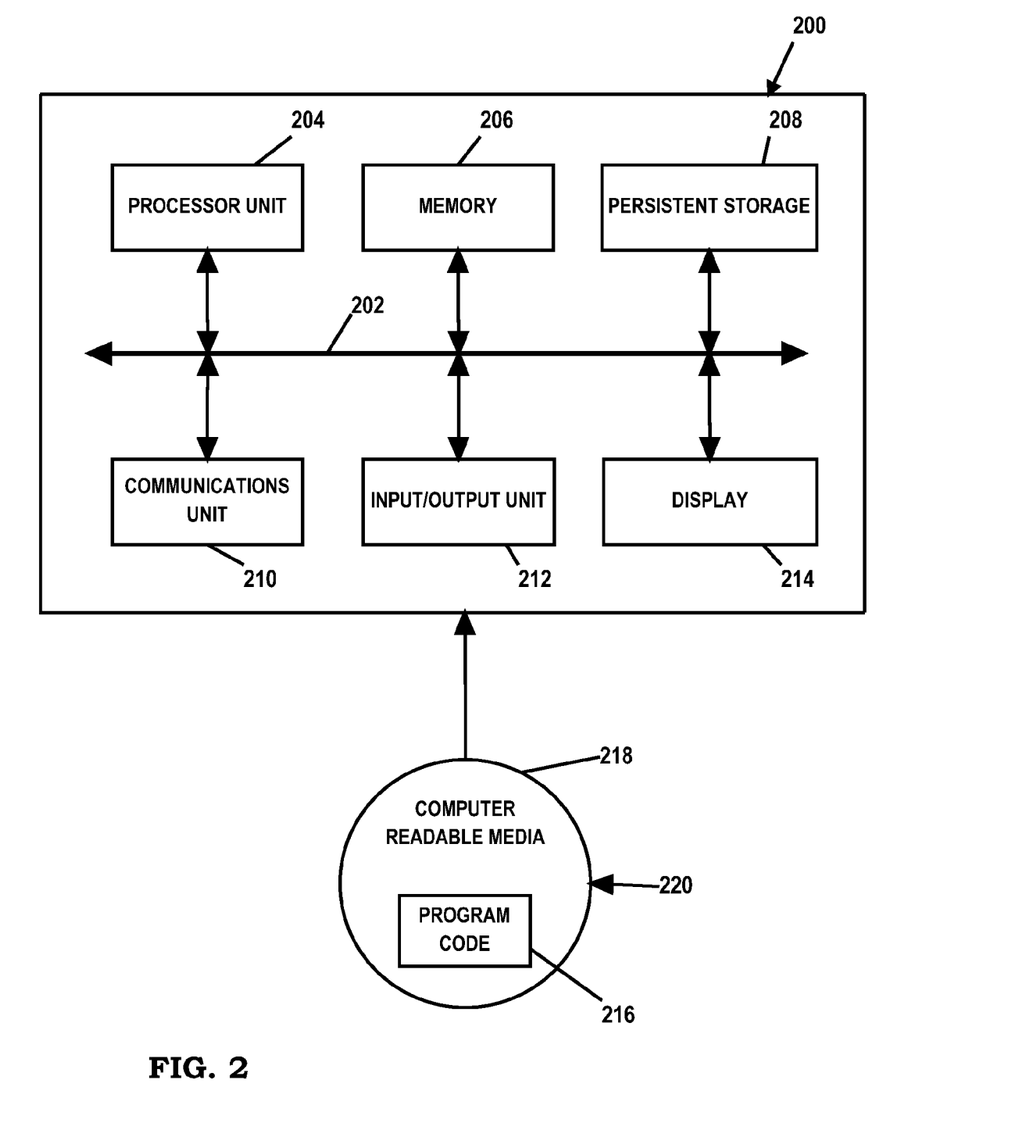
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for managing access to class objects in an application utilizing a role-based access control framework according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
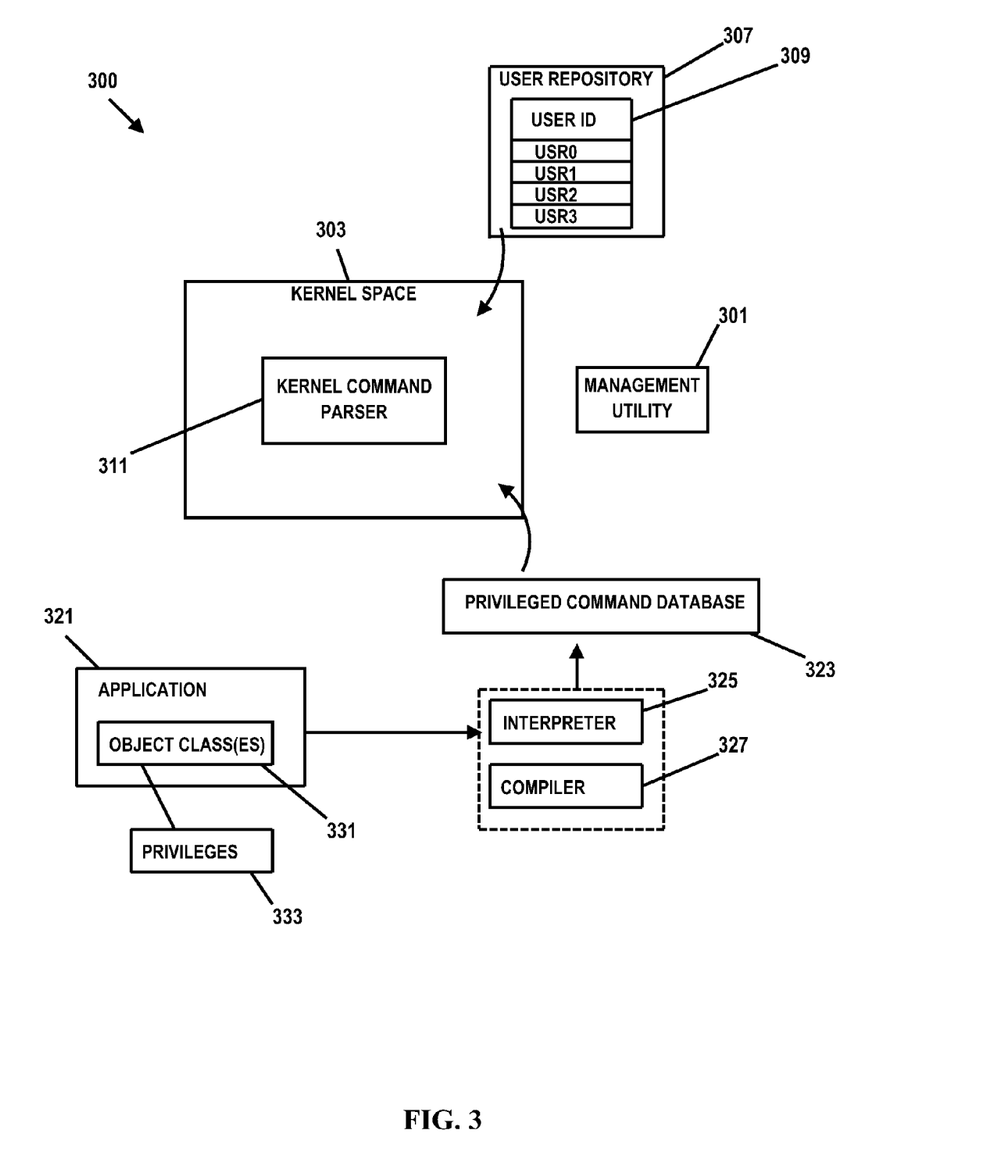
FIG. 3 is a diagram illustrating an embodiment of a data processing system for managing access to class objects in a system utilizing a role-based access control framework in which illustrative embodiments of the present disclosure may be implemented.

FIG. 3 is an illustrative embodiment of a system 300 for managing object classes of an application in a data processing system utilizing a role-based access control framework. System 300 may be implemented on data processing systems or platforms such as, but not limited to, servers 140 and/or 150, clients 110 and/or 120, or at other data processing system locations. The terms "application," "tool," "utility," and "script" are used herein to refer to one or more computer programs. The terms "process" and "instance" are used hereinto refer to an executing computer program or executing part of a computer program. To illustrate, an "operating system instance" refers to an instantiated or executing operating system computer program. A "kernel process" refers to a kernel program or kernel service executing in kernel space. "Kernel space" refers to the execution space of the kernel with privileged access to all hardware and software resources. The description also uses the term "subject" to refer to executing instances of kernel code, application code, a utility, or a tool.

An operating system ("OS") can support access to objects or resources and allow or disallow execution of a privileged task. In the illustrated embodiment, a RBAC framework and/or infrastructure is used to control access for privileged tasks. Various aspects of the RBAC framework may be carried out using a tool, utility or other application that may be stored in memory 206 and executed by processor 204 (e.g., a management utility 301 as illustrated in FIG. 3). In an RBAC framework, an authorization is analogous to access rights such that it provides a mechanism to grant rights to perform certain actions on the computer system, thereby providing different levels of functionality to different users. For instance, an OS can support different applications/systems. For example, a role is a set of management functions unique to a user of the computer system. Multiple authorizations may be assigned to a role in order to enable users under that role to perform the requisite management functions as needed. An administrator can create roles for different users to enable the users to perform a privileged task without granting the users root access.

The RBAC functionality can be implemented in an OS to grant controlled access. A user usually acquires privileges based on authorizations granted to their role. In other words, regular users are allowed access to various system functions when they have relevant privileges. Privileges are typically mapped to bit masks and are used in the kernel space to achieve privileged function-specific security controls. The tasks can be in response to commands or instructions from an executing application, executing script, process, etc. Processes or subjects running on a system will inherit the authorizations and/or privileges of a user account logged into the system.

In FIG. 3, a kernel space 303 comprises a kernel command parser 311. Kernel command parser 311 may be implemented in any suitable manner that may be hardware-based, software-based, or some combination of both. For example, kernel command parser 311 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). The kernel space 303 represents memory and processes of a kernel on a machine. The kernel command parser 311 represents executing kernel code that parses commands/instructions initiated in user space of the machine hosting the kernel space 303. Although a kernel command parser 311 is not necessarily involved in receiving a command or instruction from user space, FIG. 3 depicts an example involving a command parser to avoid encumbering the description with alternatives.

The machine that hosts the kernel space 303 is communicatively coupled with a user repository 307. The user repository 307 hosts user data (e.g., user credentials, user profiles, etc.) of users that login into the machine. The user data may at least include user identifiers (e.g., usernames, serial numbers, etc.). The user repository 307 may be local to the machine that hosts the kernel space 303. The user repository 307 may be distributed throughout a cluster or hosted at a device designated for hosting the user data accessible via a network. A root user, super-user, or a user with a highest privilege can create authorizations and roles. The super-user or root user can assign the roles to different users to perform different jobs based on need. User information is also loaded into the kernel space 303 from the user repository 307 when the machine boots up. The user information loaded into the kernel space 303 is instantiated as a user structure instance 309. The user structure instance 309 at least indicates a user identifier. In this example, the user repository 307 illustrates four different users identified as "$USR_0$," "$USR_1$," "$USR_2$" and $USR_3$." It should be understood that a fewer or greater number of users may be represented. Kernel command parser 311 receives an instruction from user space that targets a task. For example, a user may enter a request to mount a device or increase the size of a filesystem. As an example, the kernel command parser 311 can receive a message through a system call which indicates a request from a user to perform a job or task. Every system call in a UNIX or UNIX-like system, for example, is associated with a privilege. A user with authorizations on a given role shall be able to perform the job or task for invoking or executing the application. Although the above example refers to a command, embodiments are not so limited. The application would be executing as a process in a user space invoked by a user. The application process inherits the authorization and/or privileges of the user.

In FIG. 3, an application 321 and a privileged command database 323 are illustrated. Privileged command database 323 may comprise one or more privileged commands that may be invoked by a process and can run based on a user being given a role and needed privileges. Privileged command database 323 may be stored, for example, in memory 206 or elsewhere. Application 321 may represent a software application, utility or other process that is not RBAC-aware but that may invoke or cause to be invoked certain privileges. For example, application 321 may invoke various classes of objects (e.g., a Java class file) which may include an object that runs on an interpreter 325 and/or compiler 327 which is invoked by a privileged command. Thus, even though application 321 is not RBAC-aware with respect to the RBAC access control framework, only root users can execute this application causing system security concerns.

Figure 4:
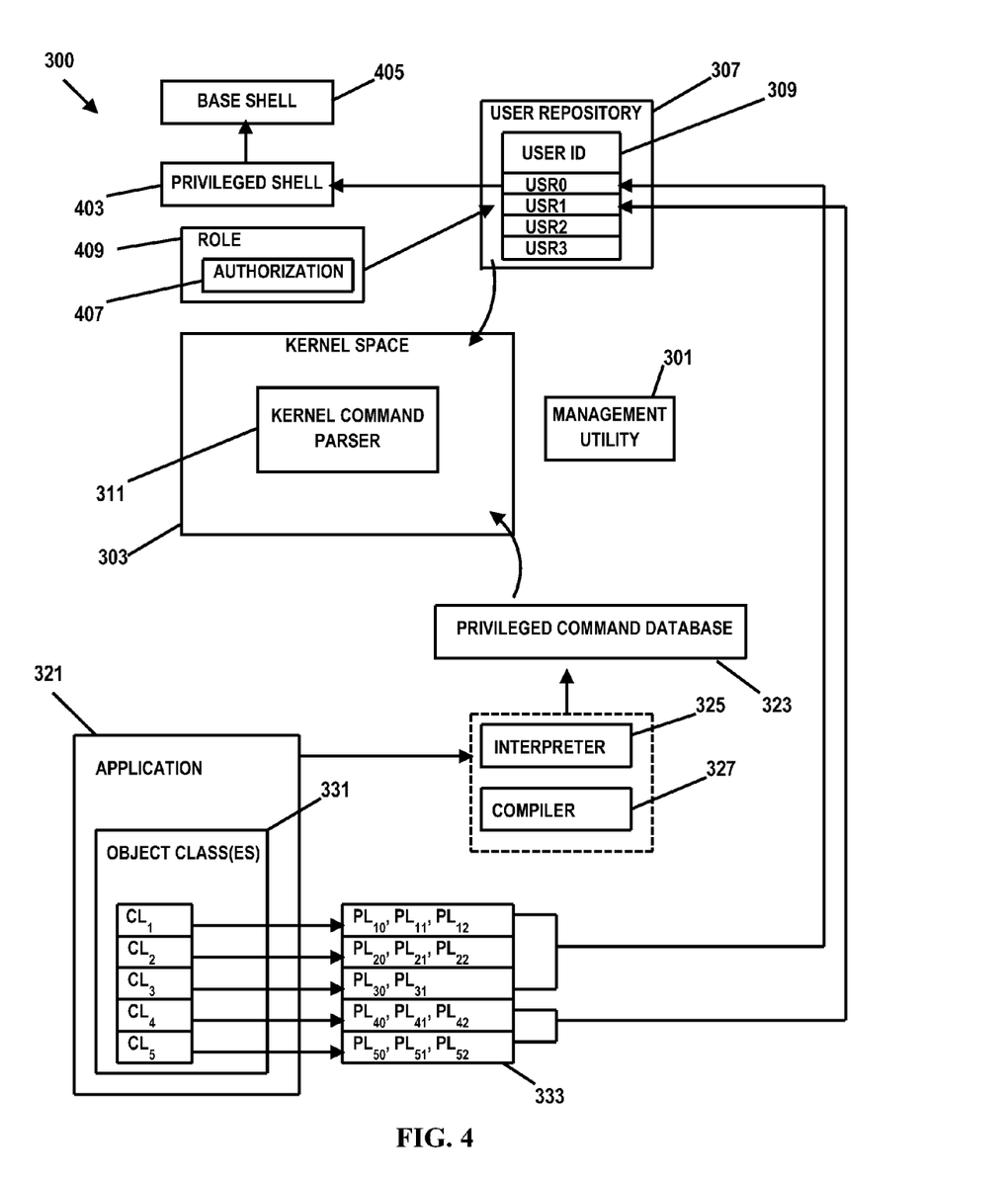
FIG. 4 is a diagram illustrating various privilege and role objects for the system of FIG. 3 according to the present disclosure.

According to embodiments of the present disclosure, a dynamically configurable shell is generated that enables application 321 to run in a RBAC-aware context for a user. FIG. 4 is a diagram illustrating configuration information corresponding to a dynamically configurable privilege shell 402 of system 300. For example, referring to FIGS. 3 and 4, in some embodiments, application 321 may cause one or more object classes 331 to be invoked (e.g., a Java or jar file that invokes a just-in-time compiler, a Java virtual machine, interpreter, etc., and which runs bytecode or other code which may be invoke by a privileged command(s)). According to the present disclosure, privileges 333 are identified for each object class 331 that may be invoked by application 321. For example, application 321 may invoke object classes $CL_1$, $CL_2$, $CL_3$, $CL_4$ and $CL_5$. Each of object classes $CL_1$, $CL_2$, $CL_3$, $CL_4$ and $CL_5$ may invoke or cause to be invoked one or more privileged operations such that corresponding RBAC-based privileges 333 are needed. In this example, object class $CL_1$ may need privileges $PL_{10}$, $PL_{11}$ and $PL_{12}$. Object class $CL_2$ may need privileges $PL_{20}$, $PL_{21}$ and $PL_{22}$. Object class $CL_3$ may need privileges $PL_{30}$ and $PL_{31}$. Object class $CL_4$ may need privileges $PL_{40}$, $PL_{41}$ and $PL_{42}$. Object class $CL_5$ may need privileges $PL_{50}$, $PL_{51}$ and $PL_{52}$. It should also be understood that certain object classes may need the same privileges (e.g., both object classes $CL_1$ and $CL_3$ may need privilege $PL_{11}$).

The identified privileges 333 needed by the object classes of application 321 are to be assigned to the application 321 for the privileges to be invoked by a user(s) with authorizations. Consider that the application 321 forks two processes—one to perform functions of server network management and another for database management. Each of the child processes will have object classes, where object classes $CL_1$, $CL_2$, and $CL_3$ are for server network management, and object classes $CL_4$ and $CL_5$ are for database management. In this example, two users $USR_0$ and $USR_1$ may need to run application 321. However, each of users $USR_0$ and $USR_1$ may need to use application 321 in a different fashion and/or for different purposes/functions. For example, user $USR_0$ may need to run application 321 for server network management functions while user $USR_1$ may need to run application 321 for database management. The different functions may need different privileges. Thus, the privileges needed for the particular object class functions are assigned to each respective user. In this example, consider that functions associated with object classes $CL_1$, $CL_2$ and $CL_3$ are needed by user $USR_0$, and functions associated with object classes $CL_4$ and $CL_5$ are needed by user $USR_1$. Accordingly, privileges $PL_{10}$, $PL_{11}$, $PL_{12}$, $PL_{20}$, $PL_{21}$, $PL_{22}$, $PL_{30}$ and $PL_{31}$ are assigned to user $USR_0$. Privileges $PL_{40}$, $PL_{41}$, $PL_{42}$, $PL_{50}$, $PL_{51}$ and $PL_{52}$ are assigned to user $USR_1$. It should be understood that if a single user needs the functionality of application 321 corresponding to all the privileges, then all the authorizations needed to invoke the application will be assigned to that user. It should also be understood that there can be two applications performing two independent functions of network server and database management which may be required to get invoked by one or two users.

A privilege shell 403 (e.g., a shell script or application interface) is created for each user having privileges assigned thereto corresponding to application 321 (e.g., privilege shell $SH_0$ for user $USR_0$ and privilege shell $SH_1$ for user $USR_1$) and hard-linked or file-linked to the respective user's base shell 405. For example, user $USR_0$ may have a privilege shell script "/usr0/bin/netksh" created and hard-linked or file-linked to the user's profile/base shell script "/bin/ksh." Similarly, user $USR_1$ may have a privilege shell script "/usr1/bin/dbaseksh" created and hard-linked or file-linked to the user's profile/base script "/bin/ksh." Additionally, an authorization(s) 407 is created for each function of application 321 needing to be invoked by the respective users $USR_0$ and $USR_1$ (e.g., "net-auth" for server network management, and "dbaseauth" for database management). The privilege shells $SH_1$ and $SH_2$ are then made RBAC-aware. For example, for user $USR_0$, shell $SH_0$ is granted with the privileges for object classes $CL_1$, $CL_2$ and $CL_3$ (e.g., privileges $PL_{10}$, $PL_{11}$, $PL_{12}$, $PL_{20}$, $PL_{21}$, $PL_{22}$, $PL_{30}$ and $PL_{31}$), and for user $USR_1$, shell $SH_1$ is granted with the privileges for object classes $CL_4$ and $CL_5$ (e.g., privileges $PL_{40}$, $PL_{41}$, $PL_{42}$, $PL_{50}$, $PL_{51}$ and $PL_{52}$). Thus, the respective shells $SH_0$ and $SH_1$ inherit the privileges of the object classes needed for each respective user invoking required functions of the application 321. Since interpreter 325 or compiler 327 invokes the applications, and if the privileges fetched for each application were assigned to the interpreter 325 or compiler 327 itself, the interpreter or just-in-time compiler will gain an accumulated set of privileges and by itself become "root," which may be a security risk. Embodiments of the present disclosure avoid assigning all the required privileges to the interpreter or just-in-time compiler by instead creating a customized, privilege shell per user based on application needs.

A role 409 is then created to include the authorization 407 based on the functions that the respective users will execute with application 321 (e.g., role $RL_0$ corresponding to the functions invoked by user $USR_0$, and role $RL_1$ corresponding to the functions invoked by user $USR_1$). The roles $RL_0$ and $RL_1$ are then assigned to the respective users $USR_0$ and $USR_1$. When the respective users $USR_0$ and $USR_1$ login to the machine/system and invoke their respective user shells $SH_0$ and $SH_1$, the users $USR_0$ and $USR_1$ get the privileges for running the respective object classes (e.g., object classes $CL_1$, $CL_2$ and $CL_3$ for user $USR_0$, and object classes $CL_4$ and $CL_5$ for user $USR_1$). Further, user $USR_0$ will not obtain privileges corresponding to object classes $CL_4$ and $CL_5$, and user $USR_1$ will not obtain privileges corresponding to object classes $CL_1$, $CL_2$ and $CL_3$). Moreover, if additional functions are needed by a user for application 321, authorizations may be assigned to the user (if needed) and the corresponding privileges of the object class functions assigned to the respective user's shell.

Figure 5:
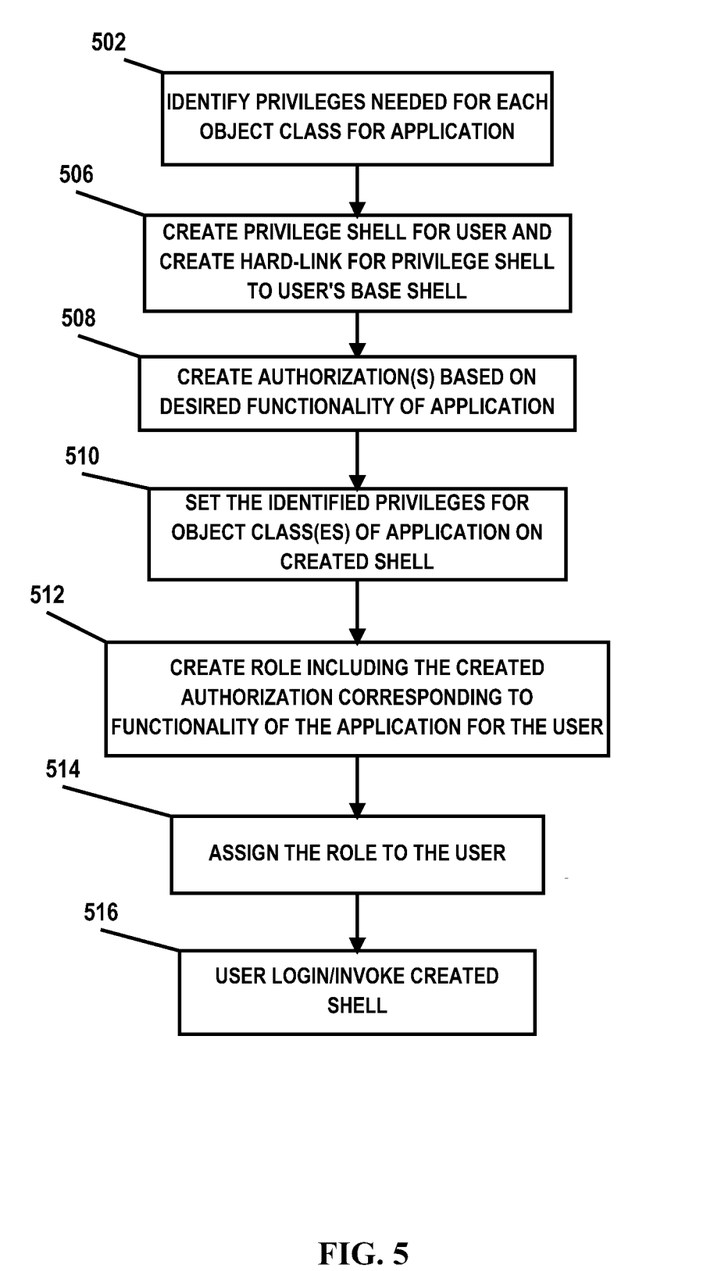
FIG. 5 is a flow diagram illustrating an embodiment of a method for managing access to class objects in a system utilizing a role-based access control framework according to the present disclosure.

FIG. 5 is a flow diagram illustrating an embodiment of a method for managing class objects for an application that is RBAC-unaware. The method begins at block 502, where the privileges needed for each object class for invoking privileged commands are determined/identified/fetched as a super-user. At block 506, a privilege shell is created for the user and hard-linked to the operating system's base login shell/script. At block 508, authorization(s) for invoking the function(s) of the application 321 for the user are created (if needed). At block 510, the privileges identified for the needed object classes are set for the created privilege shell based on the functionality isolation as needed. At block 512, a role is created with the created authorization(s) corresponding to the function(s) of the application 321 invoked by the user. At block 514, the created role is assigned to the user. At block 516, login of the user is performed and invokes the created privilege shell, thereby granting the privileges needed for the object classes of the application 321.

Thus, embodiments of the present disclosure enable applications containing object classes that are not RBAC-aware to be managed in a manner so that root privileges are not made available to unintended users. For example, in some embodiments of the present disclosure, the different classes of objects that are invoked or caused to be invoked by an RBAC-unaware application corresponding to a privileged operation are identified and assigned to a user needing to run the application. A privilege shell is created for the user and the identified privileges set for the privilege shell. The privilege shell is then made RBAC-aware and is invoked by the user, thereby enabling invocation of the privileged operation of the application based on the privileges assigned to the object classes of the application and inherited by the privilege shell.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A system, comprising:
a memory; and
a processor coupled to the memory, wherein the processor is configured to:
  determine, for each object class of an application, a privilege needed for invoking a privileged operation associated with the object class;
  for a plurality of users running the application where the users utilize different functions of the application, determine the object classes of the application for each function of the application utilized by each respective user;

create a privilege shell for each user;

set the determined privileges on the respective privilege shells based on the function utilized by the respective users;

associate an authorization to each respective privilege shell; and invoke the respective privilege shell to run the application by the respective user.

2. The system of claim 1, wherein the processor is configured to:

assign the authorization to a role; and assign the role to the respective user.

3. The system of claim 1, wherein the processor is configured to hard-link the respective privilege shell to a base shell for the respective user.

4. The system of claim 1, wherein the processor is configured to:

create a role based on the function of the application invoked by the respective user based on the object class; and assign the role to the respective user.

5. The system of claim 4, wherein the processor is configured to:

create the authorization based on the function of the application; and include the authorization in the role.

6. A computer program product for managing access to application-based objects in a system utilizing a role-based access control framework, the computer program product comprising:

a computer readable storage device having computer readable program code embodied therewith, the computer readable program code comprising computer readable program code configured to:

determine, for each object class of an application, a privilege needed for invoking a privileged operation associated with the object class;

for a plurality of users running the application where the users utilize different functions of the application, determine the object classes of the application for each function of the application utilized by each respective user;

create a privilege shell for each user;

set the determined privileges on the respective privilege shells based on the function utilized by the respective users;

associate an authorization to each respective privilege shell; and invoke the respective privilege shell to run the application by the respective user.

7. The computer program product of claim 6, wherein the computer readable program code is configured to:

assign the authorization to a role; and assign the role to the respective user.

8. The computer program product of claim 6, wherein the computer readable program code is configured to hard-link the respective privilege shell to a base shell for the respective user.

9. The computer program product of claim 6, wherein the computer readable program code is configured to:

create a role based on the function of the application invoked by the respective user based on the object class; and assign the role to the respective user.

10. The computer program product of claim 9, wherein the computer readable program code is configured to:

create the authorization based on the function of the application; and include the authorization in the role.

* * * * *